(12) United States Patent
Beijer et al.

(10) Patent No.: US 9,872,358 B2
(45) Date of Patent: Jan. 16, 2018

(54) LIGHT UNIT FOR EMITTING LIGHT AND METHOD FOR DRIVING A LIGHT UNIT

(71) Applicant: PHILIPS LIGHTING HOLDING B.V., Eindhoven (NL)

(72) Inventors: Johannes Gerrit Jan Beijer, Eindhoven (NL); Bertrand Johan Edward Hontele, Eindhoven (NL); Patrick Alouisius Martina De Bruycker, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/032,385

(22) PCT Filed: Oct. 22, 2014

(86) PCT No.: PCT/EP2014/072660
§ 371 (c)(1),
(2) Date: Apr. 27, 2016

(87) PCT Pub. No.: WO2015/062938
PCT Pub. Date: May 7, 2015

(65) Prior Publication Data
US 2016/0270182 A1    Sep. 15, 2016

(30) Foreign Application Priority Data

Nov. 4, 2013   (EP) .................... 13191385

(51) Int. Cl.
*H05B 37/00*  (2006.01)
*H05B 33/08*  (2006.01)

(52) U.S. Cl.
CPC ..... *H05B 33/0866* (2013.01); *H05B 33/0812* (2013.01); *H05B 33/0827* (2013.01); *H05B 33/0851* (2013.01); *H05B 33/0872* (2013.01)

(58) Field of Classification Search
CPC ............ H05B 33/0815; H05B 33/0827; H05B 33/0845
(Continued)

(56) References Cited

U.S. PATENT DOCUMENTS 8,456,109 B1    6/2013  Wray
8,710,754 B2 *  4/2014  Baddela ............... H05B 33/086
                                              315/192

(Continued)

FOREIGN PATENT DOCUMENTS

DE   102012205349 A1   10/2013
WO   WO2010103480 A2    9/2010

*Primary Examiner* — Tung X Le
(74) *Attorney, Agent, or Firm* — Akarsh P. Belagodu

(57) ABSTRACT

A light unit (10) is disclosed including a plurality of lighting devices (22, 24, 26), in particular a plurality of LEDs, for emitting light. The light unit comprises connection terminals (12, 14) for connecting the light unit to an external power supply (16) and for receiving an input voltage ($V_{10}$) and/or an input current ($I_T$) from the external power supply. A first current path (18) and a second current path (20) are connected to the connection terminals each comprising at least one lighting device, wherein the first current path and the second current path are connected in parallel to each other. The second current path has a controllable resistor (28) for controlling an electrical current $I_1$ in the second current path and a current limiter (30) for limiting the current in the second current path. The light unit comprises a control unit (36) adapted to control the controllable resistor on the basis of the electrical current in the second current path and on the basis of an electrical current ($I_1$) in the first current path or a total current ($I_T$) in both current paths.

17 Claims, 5 Drawing Sheets

(58) Field of Classification Search
USPC .................................... 315/185 R, 186, 192
See application file for complete search history.

(56) References Cited

U.S. PATENT DOCUMENTS

| | | | |
|---|---|---|---|
| 2006/0033456 A1* | 2/2006 | Tsai .................. | H05B 33/0803 |
| | | | 315/312 |
| 2007/0171159 A1* | 7/2007 | Lee .................... | H05B 33/0857 |
| | | | 345/83 |
| 2008/0012502 A1 | 1/2008 | Lys | |
| 2011/0031890 A1 | 2/2011 | Stack | |
| 2012/0242230 A1* | 9/2012 | Jin .................... | H05B 33/0815 |
| | | | 315/121 |
| 2013/0057163 A1 | 3/2013 | Sutardja et al. | |
| 2013/0063035 A1 | 3/2013 | Baddela et al. | |
| 2014/0062314 A1* | 3/2014 | Moskowitz ........ | H05B 33/0827 |
| | | | 315/185 R |
| 2015/0115809 A1* | 4/2015 | Siessegger ......... | H05B 33/0803 |
| | | | 315/185 R |

\* cited by examiner

LIGHT UNIT FOR EMITTING LIGHT AND METHOD FOR DRIVING A LIGHT UNIT

CROSS-REFERENCE TO PRIOR APPLICATIONS

This application is the U.S. National Phase application under 35 U.S.C. §371 of International Application No. PCT/EP2014/072660, filed on Oct. 22, 2014, which claims the benefit of European Application No. 13191385.7, filed Nov. 4, 2013. These applications are hereby incorporated by reference herein.

FIELD OF THE INVENTION

The present invention relates to a light unit including a plurality of lighting devices, in particular a plurality of LEDs for emitting light. Further, the present invention relates to a method for driving a light unit including a plurality of lighting devices, in particular a plurality of LEDs.

BACKGROUND OF THE INVENTION

In the field of retrofit lamps for replacing incandescent lamps by light units having a lower power consumption and a longer lifetime, solutions are demanded to provide a pleasant atmosphere and a behavior comparable to the incandescent lamps to be replaced.

The color of the light emitted by incandescent lamps is dependent on the electrical power provided to the lamp so that the color of the emitted light becomes warmer when the incandescent lamps are dimmed. This color shift during dimming is appreciated by the user of incandescent lamps since the warmer white provides a more pleasant atmosphere.

Since retrofit lamps which are based on LEDs do not have a color shift of the emitted light during dimming, additional effort is necessary to emulate the dimming behavior of incandescent lamps.

A simple and commonly known solution is to add amber-colored LEDs to the white LEDs which are activated when the retrofit lamp is dimmed to a predefined dimming level. By means of the amber LEDs, the emitted light is shifted to a warmer white color. However, in addition to the additional amber LEDs, a circuitry is necessary to balance the current between the white and the amber LEDs to obtain a proper color point, so that the overall technical effort of these retrofit lamps is increased.

A possibility to distribute the current between the white LEDs and the amber LEDs is to provide a string of white LEDs and a parallel string of amber LEDs and to control the current of the amber LEDs by means of a transistor as disclosed in WO 2010/103480 A2. The disadvantage of the solution is that the control of the current ratio is difficult and expensive since low voltages need to be measured and amplified with low offset voltage operational amplifiers so that the overall technical effort is large.

US2013/0063035 also discloses a light unit provided with in parallel a string of white LEDs and a string of amber LEDs. The current in the string with amber LEDs is controlled by a current regulator. In a simple configuration, the current regulator may keep the current in the string with amber LEDs constant. However this does not provide a dimming behavior comparable to an incandescent lamp. Alternatively the current regulator may be controlled by a microprocessor in order to simulate the dimming curve of an incandescent lamp during dimming. The use of a microprocessor is complicated and expensive.

SUMMARY OF THE INVENTION

It is therefore an object of the present invention to provide a light unit having a low power consumption and a dimming behavior comparable to an incandescent lamp with low technical effort and at low cost. It is further an object of the present invention provide a corresponding method for driving a light unit.

According to one aspect of the present invention, a light unit including a plurality of lighting devices, in particular a plurality of LEDs for emitting light is provided comprising:
connection terminals for connecting the light unit to an external power supply and for receiving an input voltage and/or an input current from the external power supply,
a first current path and a second current path each comprising at least one lighting device, wherein the first current path and the second current path are connected in parallel to each other, wherein the second current path has a current regulator for controlling an electrical current in the second current path,
a control unit adapted to control the controllable resistor on the basis of the electrical current in the second current path and on the basis of an electrical current in the first current path or a total current in both current paths, and
wherein the current regulator is a controllable resistor and the second current path further comprises a current limiter for limiting the current in the second current path.

According to another aspect of the present invention, a method for driving a light unit including a plurality of lighting devices, in particular a plurality of LEDs is provided comprising the steps of:
providing a drive voltage and/or a drive current to a first and a second current path connected in parallel to each other each having at least one lighting device,
controlling a current of the second current path by means of a current regulator on the basis of an electrical current in the second current path and on the basis of an electrical current in the first current path or a total current in both paths,
the current regulator being a controllable resistor, and
limiting the current in the second current path by means of a current limiter.

Preferred embodiments of the invention are defined in the dependent claims. It shall be understood that the claimed method has similar and/or identical preferred embodiments as the claimed device and as defined in the dependent claims.

The present invention is based on the idea to provide two different current paths including lighting devices emitting different colors and to control the current in one of the current path by means of the controllable resistor. Since the current in the controlled current path is limited by means of the current limiter, the current in the controlled current path does not need to be controlled for low current levels actively so that expensive control units and voltage sensors for low current levels are not necessary and the current ratio in the two current paths can be controlled with low technical effort. Hence, the light unit can be provided with different kinds of lighting devices and the color of the emitted light can be controlled during the dimming with low technical effort so that the dimming behavior of an incandescent lamp can be obtained.

In a preferred embodiment, the control unit is adapted to control the controllable resistor on the basis of the electrical current in the second current path and the total current in the first current path and the second current path. This is a possibility to reduce a technical effort, since the relevant control value can be easily obtained.

In a preferred embodiment, the controllable resistor comprises a transistor. This is a simple possibility to provide a controllable resistor for controlling the electrical current with low technical effort.

In a preferred embodiment, the control unit comprises an operational amplifier connected to two sense resistors for measuring the current in the second current path and the total current. This is a further possibility to reduce the technical effort, since the control values can be obtained directly by measuring the voltage of the sense resistors and can be easily provided to the operational amplifier for controlling the controllable resistor.

In a preferred embodiment, the control unit comprises an internal voltage supply for providing a reference voltage. This is a simple possibility to set a threshold voltage in order to set the controllable resistor to different values.

In a preferred embodiment, the current limiter is an electrical resistor. This is a simple possibility to limit the current in the second current path with low technical effort for low total current values since an equilibrium between a voltage drop of the first and the second current path provide a maximum current in the second current path without additional control effort.

It is further preferred if the electrical resistor has a resistance so that a maximum current in the second current path is set corresponding to a voltage drop difference between the at least one lighting device of the first current path and the at least one lighting device of the second current path. This is a possibility to achieve a voltage equilibrium between the first and the second current path to control the current in the second current path so that additional control effort can be omitted.

In a preferred embodiment, the at least one lighting device of the second current path, the current limiter, the controllable resistor and a sense resistor are connected in series to each other. This is a simple solution to control the current in the second current path, since the respective elements are connected in series to each other.

In a preferred embodiment, the first current path comprises a plurality of parallel current paths each having at least one lighting device. This is a possibility to achieve a continuous dimming of the lighting device, since the current of the first current path is split into two parallel currents so that the total current decreases continuously with dimming of the lighting device.

It is further preferred if each parallel current path of the first current path has a string of lighting devices. This is a further possibility to achieve a linear dimming behavior and a current in the first and the second current path as a function of the total current.

In a preferred embodiment, the second current path comprises a plurality of parallel current paths each having at least one lighting device. This is a possibility to use medium or low power LEDs in the second current path and to balance the current in the two current paths.

In a preferred embodiment, a plurality of lighting devices are connected between the first and second current path and at least one of the input terminals. This is a possibility to increase the light emission, which is independent from the controllable current path.

In a preferred embodiment, the lighting devices are formed as LEDs. This is a simple possibility to achieve a light unit having a long lifetime and low power consumption.

In a preferred embodiment, the lighting devices of the first current path and of the second current path are adapted to emit light having different colors. This is a possibility to emit different colors depending on the dimming level, since the electrical power provided to the different current path can be controlled dependent on the total electrical current.

As mentioned above, the present invention is based on the idea to control the electrical current in the second current path on the basis of the total current provided to the light unit, so that the electrical power provided to the lighting devices of the different paths can be controlled or distributed and the color of the emitted light can be changed with decreasing electrical power and of increasing the dimming level. Due to the current limiter in the second current path, the electrical current can be limited and controlled for low current values with low technical effort, so that expensive current and/or voltage measurement devices can be omitted. In this low current range, the current in the second current path is controlled by a voltage equilibrium of the different current paths since the voltage drop of the lighting devices of the first current path which are preferably LEDs set the current in the second current path to a predefined level. Consequently, the dimming behavior of an incandescent lamp can be obtained with low power consumption and low technical effort.

BRIEF DESCRIPTION OF THE DRAWINGS

These and other aspects of the invention will be apparent from and elucidated with reference to the embodiment(s) described hereinafter. In the following drawings

FIG. 5 shows a further embodiment of the light unit of FIG. 1a.

DETAILED DESCRIPTION OF THE INVENTION

Figure 1A:
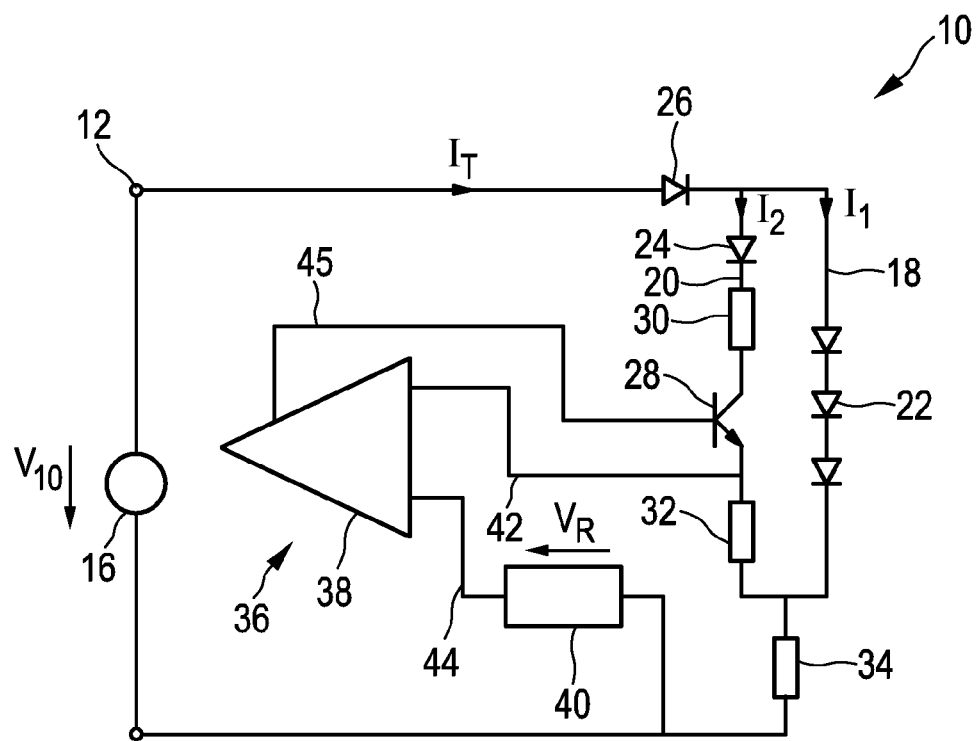
FIG. 1a shows a schematic block diagram of a lighting device having different current paths and FIG. 1b a diagram showing the current in the different current paths.

FIG. 1a shows a lighting device generally denoted by 10. The lighting device 10 comprises two input terminals 12, 14 for connecting the lighting device 10 to a power supply 16 and for receiving a drive voltage V10 and/or a drive current $I_T$ from the power supply 16. The power supply 16 may be a voltage supply or a current supply. The lighting device 10 comprises a first current path 18 and a second current path 20 connected in parallel to each other and connected to the input terminals 12, 14 for receiving the input voltage V10. The first current path 18 comprises a plurality of LEDs 22, preferably emitting white light and wherein the second current path 20 comprises at least one LED 24 which preferably emits amber light (phosphor coated LEDs). In series to the first and the second current path 18, 20 one or more white LEDs 26 can be connected.

The drive current $I_T$ as a total current $I_T$ is provided to the light unit for driving the LEDs 22, 24, 26 as a drive current, wherein the total current $I_T$ is split in two currents $I_1$, $I_2$ in the two parallel current paths 18, 20, respectively. The light emission of the light unit 10 is controlled and determined by the total current $I_T$ provided to the light unit 10.

The second current path 20 further comprises a controllable resistor 28, which is preferably formed as a bipolar transistor 28, and a current limiter 30, which is formed as an electrical resistor 30 in order to control the current $I_2$ in the second current path 20 as described in the following.

The controllable resistor 28 controls the current $I_2$ in the second current path 20 in order to increase an amount of amber light emitted from the light unit 10 when the total current $I_T$ is decreased and the light unit 10 is dimmed as described in the following.

The second current path 20 further comprises a sense resistor 32 for measuring the current $I_2$ in the second current path 20. The first current path 18 and the second current path 20 are connected via a sense resistor 34 to one of the input terminal 14 for measuring the total current $I_T$.

The light unit 10 further comprises a control unit 36 for controlling the controllable resistor 28 on the basis of the current $I_2$ in the second current path 20 and the total current $I_T$. The control unit 36 comprises an operational amplifier 38 and a reference voltage supply 40. Input terminals 42, 44 of the operational amplifier 38 are connected to the sense resistors 32, 34 and to the reference voltage supply 40. The output terminal 45 of the operational amplifier 38 is connected to the controllable resistor 28 for controlling the controllable resistor 28. Since the input terminals 42, 44 are connected to the sense resistors 32, 34 and to the reference voltage supply 40, the controllable resistor 28 can be controlled on the basis of a voltage drop corresponding to the current $I_2$ in the second current path 20 and the total current $I_T$ and on the basis of a threshold level $V_R$ provided by the reference voltage supply 40. If the voltage drop across the sense resistors 32, 34 is larger than the reference voltage $V_R$ provided by the reference voltage supply 40, the resistance of the controllable resistor 28 is set to a large value or to an infinite value. If the voltage drop across the sense resistors 32, 34 is lower than the reference voltage $V_R$, the resistance of the controllable resistor 28 is set to 0 and in other cases, i.e. for values between, the resistance of the controllable resistor 28 is set to a value so that the voltage drop across the sense resistors 32, 34 is equal to the reference voltage $V_R$. For the case that the resistance of the controllable resistor 28 is set to 0, the current limiter 30, which is formed as electrical resistor 30 limits the current $I_2$ to a predefined level so that the technical effort for controlling the current $I_2$ for low total current values is reduced. Consequently, the ratio of the currents $I_1$ and $I_2$ of the first and the second current path 18, 20 can be set depending on the total current $I_T$ so that amber light can be added to the light emitted by the light unit 10 when the light unit 10 is dimmed. Hence, the dimming behavior of an incandescent lamp can be emulated.

Figure 1B:
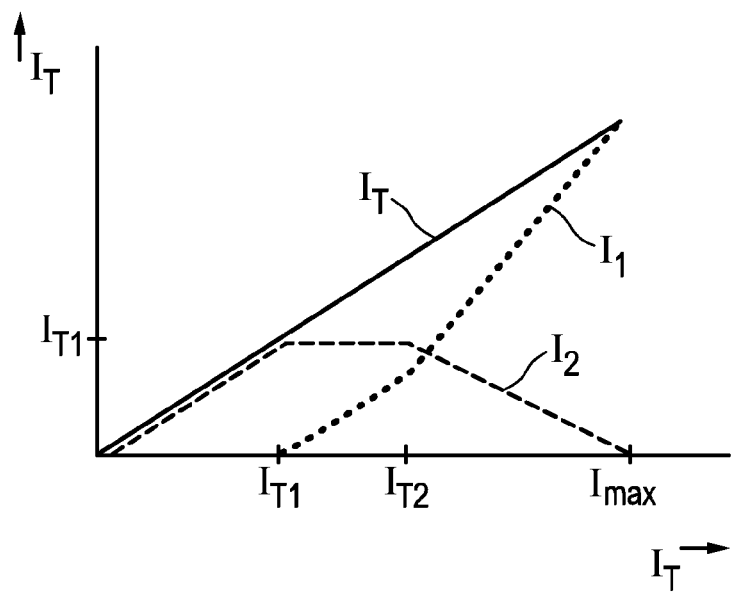

In FIG. 1b the total current $I_T$, the current $I_1$ in the first current path 18 and the current $I_2$ in the second current path 20 are shown dependent on the total current $I_T$. At $I_{max}$ as a maximum value of the total current $I_T$, the resistance of the controllable resistor 28 is large or infinite so that the current $I_1$ is identical with the total current $I_T$ and only the white LEDs 22 are powered to emit light. When the total current $I_T$ is reduced in a range between a total current $I_{T2}$ and the maximum total $I_{max}$, the resistance of the controllable resistor 28 is set to a value such that $R_A*I_1+R_T*I_T=V_R$, wherein $R_A$ is the resistance of the sense resistor 32 and $R_T$ is the resistance of the sense resistor 34. Hence, the current $I_1$ decreases and the current $I_2$ increases so that the amount of white light emitted by the LEDs 22 is reduced while the amount of amber light provided by the LED 24 is increased. As shown in FIG. 1b, the current $I_1$ decreases faster than the current $I_2$ increases so that the total current $I_T$ decreases and the overall light emission of the light unit 10 decreases. For values of the total current $I_T$ lower than the current $I_{T2}$, the resistance of the controllable resistor 28 is set to 0. Hence, the ratio of the currents $I_1$ and $I_2$ is merely controlled by means of the voltage drop at the LEDs 22, 24 and the current limiter 30. Since the voltage drop at the LEDs 22, 24 is almost constant for a large current range, the voltage drop at the current limiter 30 corresponds to the voltage drop difference between the LEDs 22 of the first current path 18 and the voltage drop of the LED 24 of the second current path 20. Due to the constant voltage drop at the LEDs 22, the current limiter 30 sets the current $I_2$ to a corresponding constant current level. Hence, the current $I_2$ of the second current path 20 is set to a constant level $I_{T1}$ until the total current $I_T$ drops below this constant level $I_{T1}$. For a total current $I_T$ below $I_{T1}$, the current $I_1$ is 0 and the current $I_2$ in the second current path 20 is identical with the total current $I_T$. Hence, the relative amount of amber light can be continuously increased when the light unit 10 is dimmed with low technical effort, since the current limiter 30 controls the current $I_2$ in the second current path 20 for lower current levels. Further, the control of the current $I_2$ in the second current path 20 is only dependent on the total current $I_T$, so that the light unit 10 can be dimmed without additional effort for the user. Below $I_{T1}$, the relative amount of amber light is nearly constant since $I_1=0$ and therefore $I_T=I_2$ without current control by means of the controllable resistor 28.

The size of the current limiter 30, which is formed as an electrical resistor is selected corresponding to the voltage drop difference between the LEDs 22, 24 of the first current path 18 and the second current path 20 and the constant current $I_{T1}$ to which the current $I_2$ should be limited. For example, if the voltage drop of the LEDs 22, 24 is 3 V, the voltage drop difference for the embodiment shown in FIG. 1a is 6 V and for the case that the maximum current $I_{T1}$ in the second current path 20 is 100 mA, the resistance of the current limiter 30 is set to 60Ω.

By means of the current limiter 30, a lower maximum of the current $I_2$ in the second current path 20 can be achieved since the current $I_2$ is limited to the value $I_{T1}$ that forms a plateau in the current diagram as shown in FIG. 1a. Further, by means of the plateau of the current $I_2$, the current $I_1$ in the first current path 18 is reduced with a lower gain so that a more gradual change of the emitted color can be achieved.

Figure 2A:
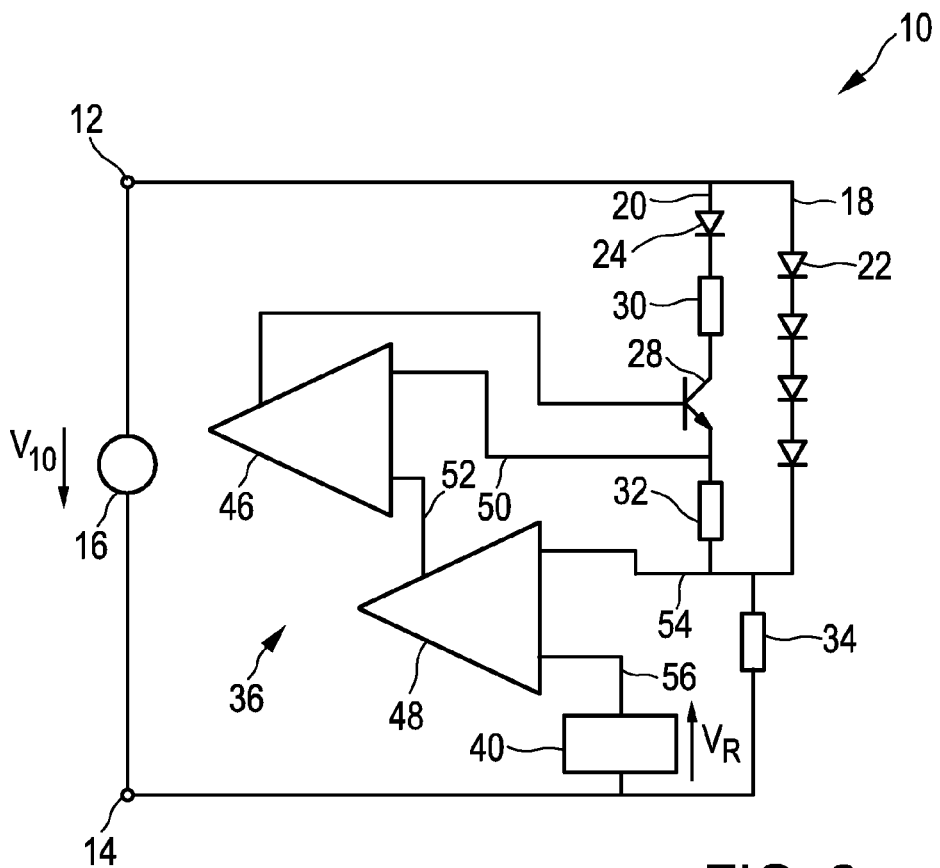
FIG. 2a shows a schematic block diagram of an embodiment of the lighting device of FIG. 1 and FIG. 2b a corresponding current diagram.
Figure 2B:
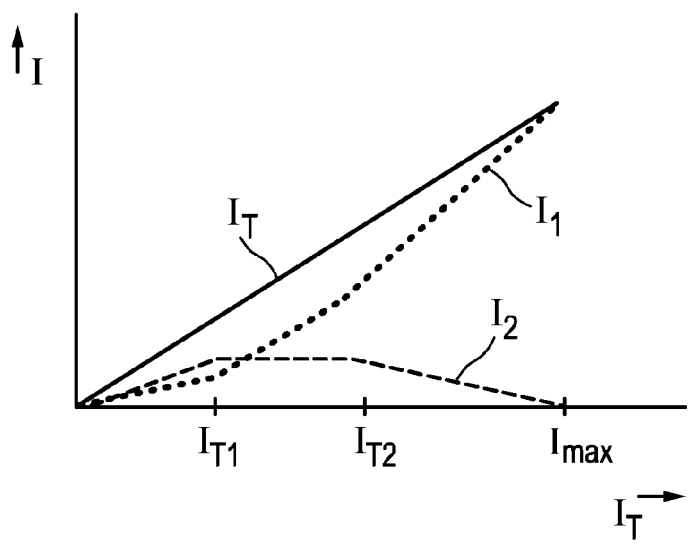

A further embodiment of the light unit 10 is shown in FIG. 2a and the corresponding current diagram is shown in FIG. 2b. Identical elements are denoted by identical reference numerals, wherein here merely the differences are explained in detail.

The control unit 36 comprises in this embodiment two operational amplifiers 46, 48 connected in a cascade to each other, wherein the first operational amplifier 46 is connected to the controllable resistor 28 for driving the controllable resistor 28. The input terminals 50, 52 of the first operational amplifier 46 are connected to the sense resistor 32 and to the output of the second operational amplifier 48. The input terminals 54, 56 of the second operational amplifier 48 are connected to the sense resistor 34 and to the reference voltage supply 40. Hence, the resistance of the controllable resistor 28 can be set more precisely on the basis of independent measurements of the sense resistors 32, 34 and a lower current $I_2$ in the second current path 20 can be set to a lower maximum value so that the amber LED 24 can be relieved electrically and/or thermally.

The respective current diagram is shown in FIG. 2b, wherein it is shown that the current $I_1$ and the current $I_2$ can be controlled more precisely and the current $I_1$ is reduced with a lower gain so that a more continuous change of the emitted light color can be achieved. For total currents below $I_{T1}$, the currents $I_1$ and $I_2$ have a nearly constant ratio, determined by the current control, resulting in a nearly constant relative amount of amber light. Hence, a more pleasant change of the emitted light color can be achieved.

Finally also in this case, if there would be no plateau region, there would exist a transition point at the maximum amber current position, where on the left a first control loop is active and on the right a second control loop, both controlling the transistor. This sudden transition can cause some flickering at and near this point. The presence of the plateau in the current $I_2$ eliminates this transition point and therefore reduces the chance of flickering.

Figure 3A:
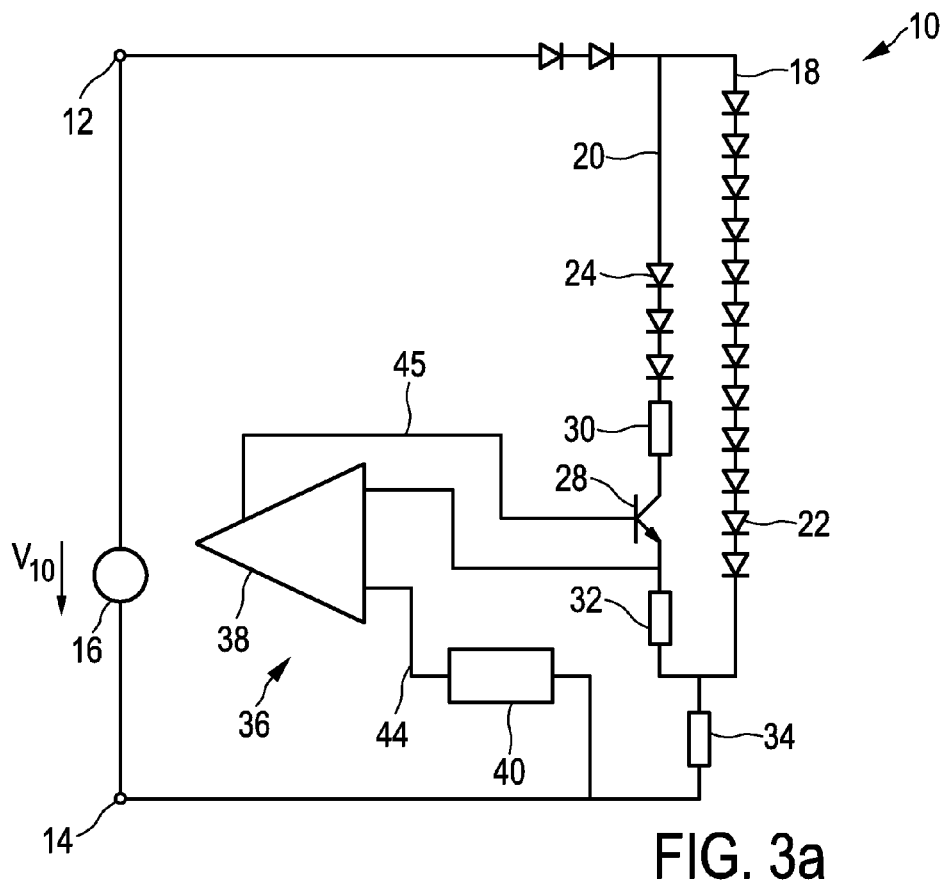
FIG. 3a shows a schematic block diagram of an embodiment of the light unit shown in FIG. 1 and FIG. 3b a corresponding current diagram.
Figure 3B:
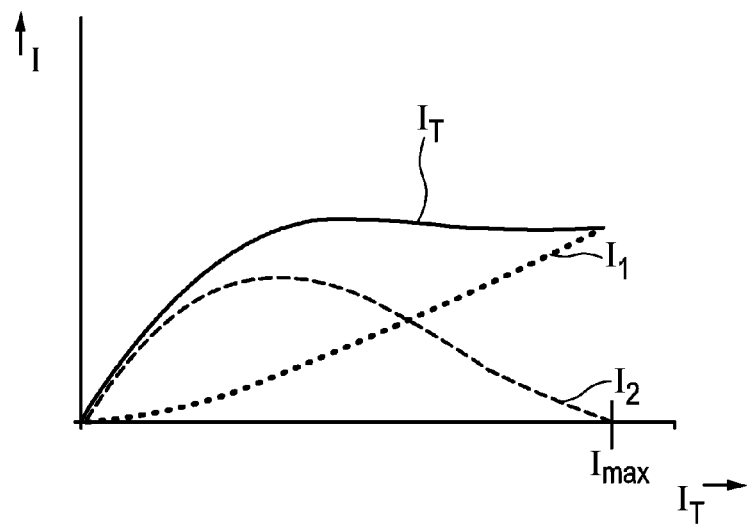

In FIG. 3a a further embodiment of the light unit 10 is schematically shown, wherein a corresponding current diagram is shown in FIG. 3b. Identical elements are denoted by identical reference numerals, wherein here merely the differences are explained in detail.

The first current path 18 comprises a string of twelve white diodes 22 and the second current path 20 comprises three amber diodes 24. When dimming the light unit 10 of FIG. 3a from the maximum current $I_{max}$, the current in the second current path 120 needs to be increased faster than the current in the first current path 18 decreases. Hence, the total current $I_T$ increases slightly with dimming so that no current split in the two current paths is possible as shown in FIG. 3b.

To overcome this problem, the first current path 18 is split in two parallel paths 58, 60 each having six white LEDs 22. Due to the fact that the total current $I_T$ is split in the two paths 58, 60 and the second path 20, the total current follows a straight line as shown in FIG. 4b. Further, the white LEDs 26 shown in FIG. 1a are replaced by two parallel LEDs 62, 64 and the LEDs 24 of the second current path 20 are replaced by LEDs emitting a warm white corresponding to a color temperature of 2200 K.

Figure 4A:
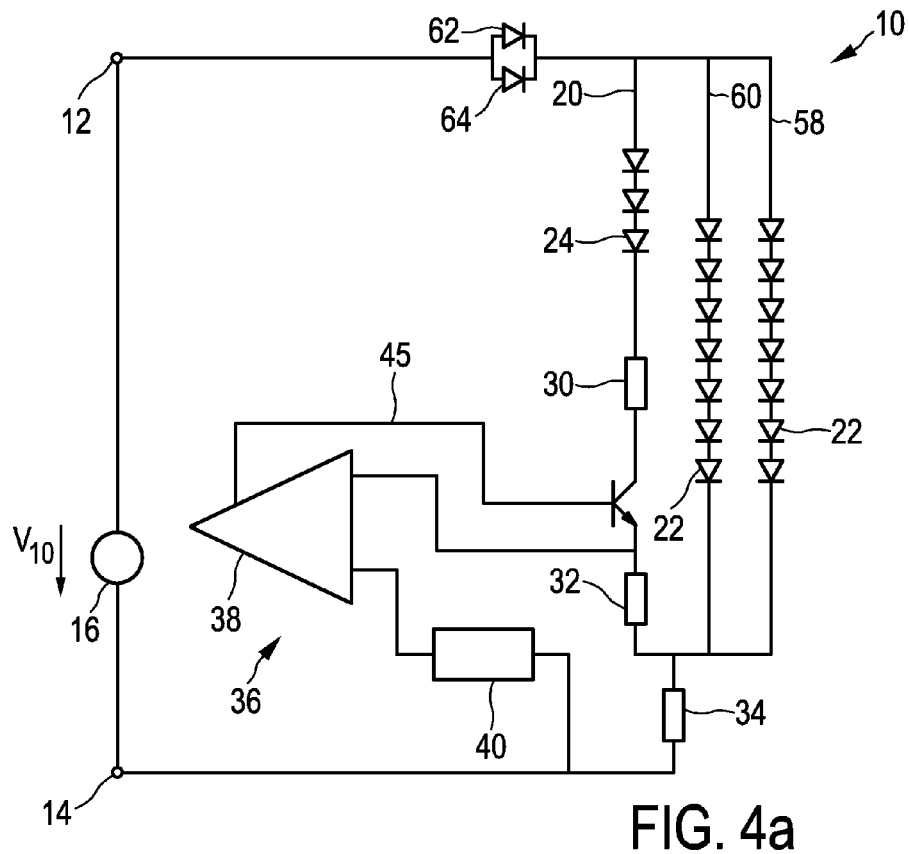
FIG. 4a shows an embodiment of the light unit shown in FIG. 1a and FIG. 4b a corresponding current diagram.
Figure 4B:
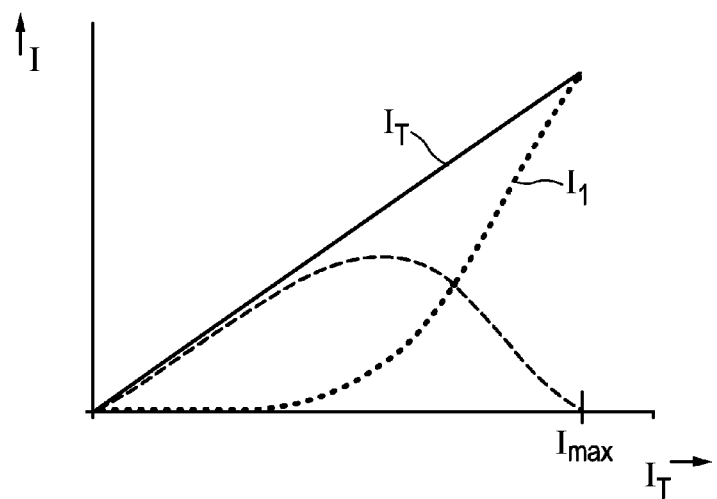

By means of the embodiment shown in FIG. 4a, the straight and linear behavior of the total current can be achieved as shown in FIG. 4b.

Figure 5:
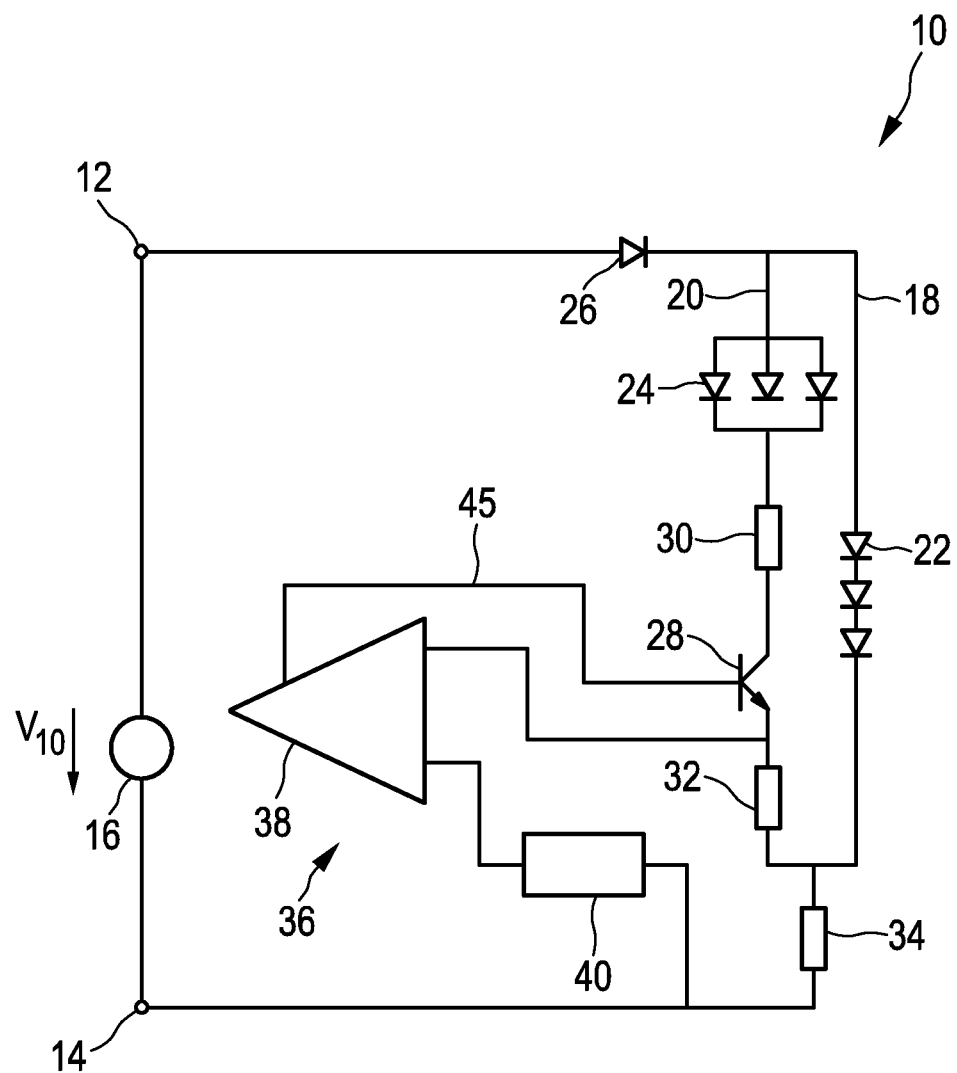

FIG. 5 shows a further embodiment of the light unit 10. Identical elements are denoted by identical reference numerals, wherein here merely the differences are explained in detail.

The LEDs 24 of the second current path are connected in parallel to each other, wherein the white LEDs 22 are high lumen or high power LEDs and the amber LEDs 24 are low lumen or mid power LEDs. Hence, the total costs of the light unit 10 can be reduced, however, the amber or warm white LEDs 24 have to be connected in parallel to each other to balance the current through the LEDs and/or the voltage of the white LEDs 22 and the amber LEDs 24.

The LEDs 22, 24 may be replaced by 2200K warm white LEDs.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A lighting unit including a plurality of lighting devices for emitting light, the lighting unit comprising:
   connection terminals for connecting the lighting unit to an external power supply and for receiving an input voltage and/or an input current from the external power supply;
   a first current path and a second current path each comprising at least one lighting device, wherein the first current path and the second current path are connected in parallel to each other, and wherein the second current path comprises a current regulator, including a controllable resistor, for controlling an electrical current in the second current path, and a current limiter for limiting the electrical current in the second current path when resistance of the controllable resistor is set to zero;
   a sense resistor disposed outside the second current path; and
   a control unit for controlling the current regulator based on the electrical current measured in the second current path and on a total current in both the first and second current paths measured with the sense resistor which is disposed outside the second current path.

2. The lighting unit as claimed in claim 1, wherein the current limiter is an electrical resistor, and the controllable resistor comprises a transistor in series with the electrical resistor.

3. The lighting unit as claimed in claim 1, wherein the control unit comprises an operational amplifier connected to two sense resistors for measuring the electrical current in the second current path and the total current, respectively, and wherein the second current path comprises one sense resistor of the two sense resistors, the one sense resistor being different from the current limiter.

4. The lighting unit as claimed in claim 1, wherein the control unit comprises an internal voltage supply for providing a reference voltage.

5. The lighting unit as claimed in claim 1, wherein the current limiter is an electrical resistor having a resistance so that the electrical current in the second current path to be identical with the total current when the total current is below a maximum current of the electrical current in the second current path, and the electrical current in the second current path plateaus at the maximum current when the total current is above the maximum current.

6. The lighting unit as claimed in claim 5, wherein the electrical resistor has a resistance so that the maximum current in the second current path is set corresponding to a voltage drop difference between the at least one lighting device of the first current path and the at least one lighting device of the second current path.

7. The lighting unit as claimed in claim 6, wherein the electrical resistor equals to the quotient resulted from the voltage drop divided by the maximum current.

8. The lighting unit as claimed in claim 1, wherein the at least one lighting device of the second current path, the current limiter, the controllable resistor and a sense resistor are connected in series to each other.

9. The lighting unit as claimed in claim 1, wherein the first current path comprises a plurality of parallel current paths each having at least one lighting device.

10. The lighting unit as claimed in claim 9, wherein each parallel current path of the first current path has a string of lighting devices.

11. The lighting unit as claimed in claim 1, wherein the second current path comprises a plurality of parallel current paths each having at least one lighting device.

12. The lighting unit as claimed in claim 1, wherein a plurality of lighting devices are connected between the first and second current path and at least one of the input terminals.

13. The lighting unit as claimed in claim 1, wherein the lighting devices are formed as LEDs.

14. The lighting unit as claimed in claim 1, wherein the lighting devices of the first current path and of the second current path are adapted to emit light having different colors.

15. The lighting unit as claimed in claim 14, wherein the lighting devices of the first current path emit white light and the lighting devices of the second current path emit amber light.

16. A method for driving a light unit including a plurality of lighting devices, the method comprising:
   providing a drive voltage and/or a drive current to a first current path and a second current path connected in parallel to each other, each of the first and second current paths having at least one lighting device;
   controlling a current in the second current path by a current regulator based on an electrical current in the second current path measured in the second current path and based on a total current in both of the first and second current paths measured via a sense resistor which is disposed outside the second current path, the current regulator being a controllable resistor; and
   limiting the electrical current in the second current path by a current limiter when resistance of the controllable resistor is set to zero.

17. The method as claimed in claim 16, wherein the plurality of lighting devices comprise a plurality of LEDs.

* * * * *